United States Patent
Cooper

(10) Patent No.: US 8,027,961 B2
(45) Date of Patent: Sep. 27, 2011

(54) SYSTEM AND METHOD FOR COMPOSITE RECORD KEYS ORDERED IN A FLAT KEY SPACE FOR A DISTRIBUTED DATABASE

(75) Inventor: Brian Cooper, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 395 days.

(21) Appl. No.: 12/395,597

(22) Filed: Feb. 27, 2009

(65) Prior Publication Data
US 2010/0223240 A1 Sep. 2, 2010

(51) Int. Cl.
*G06F 17/30* (2006.01)
(52) U.S. Cl. .................... 707/696; 707/752
(58) Field of Classification Search ............. 707/696, 707/698, 715, 740–747, 752–754, 803, 830, 707/999.002, 999.007, 999.1, E17.048, E17.049, 707/E17.05, E17.052, E17.053, E17.057
See application file for complete search history.

(56) References Cited

U.S. PATENT DOCUMENTS

| 7,698,325 B1* | 4/2010 | Ozekinci et al. ............. 707/698 |
| 2003/0023594 A1* | 1/2003 | Ramamurthi .................... 707/7 |
| 2005/0004924 A1* | 1/2005 | Baldwin ....................... 707/100 |
| 2007/0016596 A1* | 1/2007 | Fabret et al. ................. 707/100 |
| 2008/0005155 A1* | 1/2008 | Soma et al. .................. 707/102 |

* cited by examiner

*Primary Examiner* — Greta Robinson
(74) *Attorney, Agent, or Firm* — Michael J. Buchenhorner

(57) ABSTRACT

An improved system and method for composite record keys ordered in a flat key space for a distributed database is provided. A data schema may be created that defines a composite record key for data records in a canonical form. Composite record keys may then be constructed in canonical form defined by the data schema for each data record in data tables of a distributed database. An ordered index of composite record keys may then be built by inserting the composite record keys in canonical form into the index in sorted order. The index of composite record keys ordered in a flat key space for a distributed database may then be used for efficiently comparing or sorting distributed data records in the distributed database. The composite record keys ordered in a flat key space may be compared or sorted without referencing the data schema of the composite record keys.

20 Claims, 5 Drawing Sheets

SYSTEM AND METHOD FOR COMPOSITE RECORD KEYS ORDERED IN A FLAT KEY SPACE FOR A DISTRIBUTED DATABASE

FIELD OF THE INVENTION

The invention relates generally to computer systems, and more particularly to an improved system and method for composite record keys ordered in a flat key space for a distributed database.

BACKGROUND OF THE INVENTION

Today many commercial distributed database systems may deploy an unordered hierarchical key space for composite database record keys. Database records may be distributed among a hierarchy of database servers and processing a user query for retrieving database records with multiple record keys may involve a different database server for each of the multiple record keys in order to retrieve the requested database records. The data schema information may be present on all servers or it may be distributed consistent with the distribution of database records. For each of the multiple record keys, a lookup may be made based on the data type of the key to find a server in a hierarchy of servers storing a range of records that include the next record key. A lookup based on the data type of the next key may occur on the next server and so on until the location of the data record is found. The multiple record keys of the composite database record key may be in a distributed index. The comparisons of the multiple lookup for each key of the composite record key are performed sequentially and may also be distributed, resulting in inefficient lookup of composite record keys to retrieve a record.

In other distributed databases, hashing of composite record keys may be used where ranges of records are randomly distributed among database servers. Unfortunately, these composite keys are also unordered and distributed among the servers so that it is inefficient to sort composite record keys.

What is needed is a way to provide composite record keys that may be efficiently sorted and compared for a large distributed database. Such a system and method should support maintenance of the metadata on one or few machines and not be distributed with the data records. Furthermore, a high throughput should be achieved for composite key sorting with minimal state transfer between servers.

SUMMARY OF THE INVENTION

The present invention provides a system and method for composite record keys ordered in a flat key space for a distributed database. In a distributed database system of operably coupled database servers, each database server may include a database engine that communicates with a client, communicates with the database servers to satisfy client requests, accessing the database, and processing database queries. The database engine may include a query processor for processing received queries including retrieving a data record from a data table in the database, a data schema maintenance engine for updating the data schema defining composite record keys stored in a composite record key index ordered in a flat key space, a composite record key encoder for generating composite record keys for data records, and a storage manager for reading data records from the database and writing data records to the database.

In an embodiment for generating composite record keys ordered in a flat key space for a distributed database, a data schema may be created that defines a composite record key for data records in a canonical form. Composite record keys may then be constructed in canonical form defined by the data schema for each data record in data tables of a distributed database. An ordered index of composite record keys may then be built by inserting the composite record keys in canonical form into the index in sorted order. The index of composite record keys ordered in a flat key space for a distributed database may then be used for efficiently comparing or sorting distributed data records in the distributed database. For instance, in an embodiment to retrieve a data record in a data table of a distributed database, a query request with multiple record keys may be received from an application to retrieve a data record in a data table of a distributed database. A composite record key may then be constructed in canonical form defined by the data schema for the multiple record keys from the query request and used to perform a lookup of the data record corresponding to the composite record key in the ordered index of composite record keys. And the data record found for the corresponding composite record key in the ordered index may be retrieved and returned as a response to the query request.

The present invention may be used to efficiently sort large data sets particularly where each record in the data set is a composite of multiple typed attributes. For instance, an efficient distributed sort, such as a map-reduce algorithm may be performed over the keys without having to communicate data schema information between components of the distributed system. As another example, composite record keys ordered in a flat key space may be used for ordered storage of large data sets on disk in various sorted formats. As yet another example, composite record keys ordered in a flat key space may be used for efficient data routing in a distributed storage system where the partitions of data are stored on different servers without having to store the data schema of the composite record key on the router or look it up during routing. For any of these uses, composite record keys ordered in a flat key space may be compared by optimized machine instructions for comparing strings, rather than complex code that must take different comparison actions based on the type of attribute of the multiple key types. Moreover, the composite record keys ordered in a flat key space may be compared or sorted without the need to reference the data schema of the composite record keys.

Other advantages will become apparent from the following detailed description when taken in conjunction with the drawings, in which:

DETAILED DESCRIPTION

Exemplary Operating Environment

Figure 1:
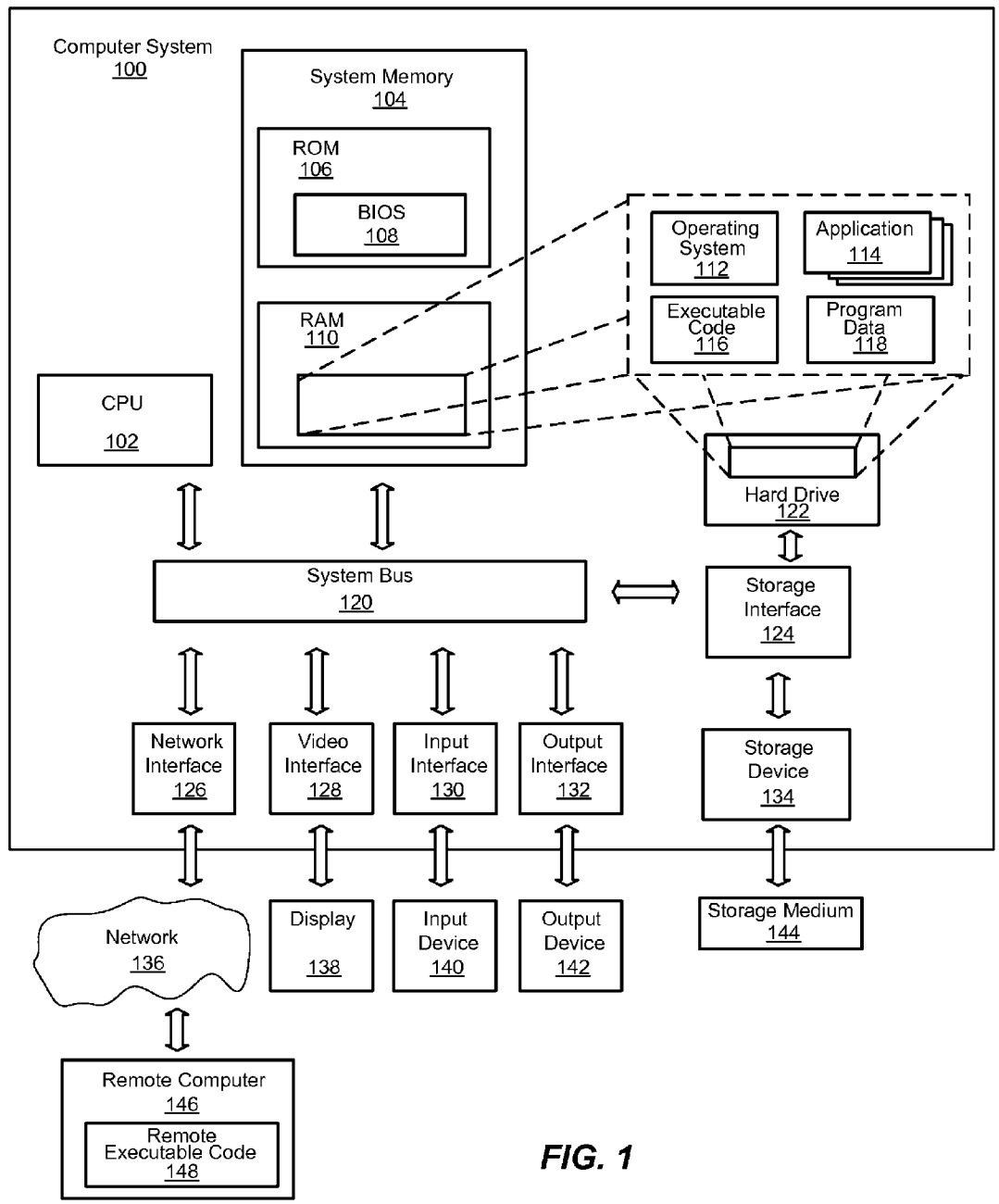
FIG. 1 is a block diagram generally representing a computer system into which the present invention may be incorporated.

FIG. 1 illustrates suitable components in an exemplary embodiment of a general purpose computing system. The exemplary embodiment is only one example of suitable components and is not intended to suggest any limitation as to the scope of use or functionality of the invention. Neither should the configuration of components be interpreted as having any dependency or requirement relating to any one or combination of components illustrated in the exemplary embodiment of a computer system. The invention may be operational with numerous other general purpose or special purpose computing system environments or configurations.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention may include a general purpose computer system 100. Components of the computer system 100 may include, but are not limited to, a CPU or central processing unit 102, a system memory 104, and a system bus 120 that couples various system components including the system memory 104 to the processing unit 102. The system bus 120 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer system 100 may include a variety of computer-readable media. Computer-readable media can be any available media that can be accessed by the computer system 100 and includes both volatile and nonvolatile media. For example, computer-readable media may include volatile and nonvolatile computer storage media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer system 100. Communication media may include computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For instance, communication media includes wired media such as a wired network or direct-wired connection, and wireless media such as acoustic, RF, infrared and other wireless media.

The system memory 104 includes computer storage media in the form of volatile and/or nonvolatile memory such as read only memory (ROM) 106 and random access memory (RAM) 110. A basic input/output system 108 (BIOS), containing the basic routines that help to transfer information between elements within computer system 100, such as during start-up, is typically stored in ROM 106. Additionally, RAM 110 may contain operating system 112, application programs 114, other executable code 116 and program data 118. RAM 110 typically contains data and/or program modules that are immediately accessible to and/or presently being operated on by CPU 102.

The computer system 100 may also include other removable/non-removable, volatile/nonvolatile computer storage media. By way of example only, FIG. 1 illustrates a hard disk drive 122 that reads from or writes to non-removable, nonvolatile magnetic media, and storage device 134 that may be an optical disk drive or a magnetic disk drive that reads from or writes to a removable, a nonvolatile storage medium 144 such as an optical disk or magnetic disk. Other removable/non-removable, volatile/nonvolatile computer storage media that can be used in the exemplary computer system 100 include, but are not limited to, magnetic tape cassettes, flash memory cards, digital versatile disks, digital video tape, solid state RAM, solid state ROM, and the like. The hard disk drive 122 and the storage device 134 may be typically connected to the system bus 120 through an interface such as storage interface 124.

The drives and their associated computer storage media, discussed above and illustrated in FIG. 1, provide storage of computer-readable instructions, executable code, data structures, program modules and other data for the computer system 100. In FIG. 1, for example, hard disk drive 122 is illustrated as storing operating system 112, application programs 114, other executable code 116 and program data 118. A user may enter commands and information into the computer system 100 through an input device 140 such as a keyboard and pointing device, commonly referred to as mouse, trackball or touch pad tablet, electronic digitizer, or a microphone. Other input devices may include a joystick, game pad, satellite dish, scanner, and so forth. These and other input devices are often connected to CPU 102 through an input interface 130 that is coupled to the system bus, but may be connected by other interface and bus structures, such as a parallel port, game port or a universal serial bus (USB). A display 138 or other type of video device may also be connected to the system bus 120 via an interface, such as a video interface 128. In addition, an output device 142, such as speakers or a printer, may be connected to the system bus 120 through an output interface 132 or the like computers.

The computer system 100 may operate in a networked environment using a network 136 to one or more remote computers, such as a remote computer 146. The remote computer 146 may be a personal computer, a server, a router, a network PC, a peer device or other common network node, and typically includes many or all of the elements described above relative to the computer system 100. The network 136 depicted in FIG. 1 may include a local area network (LAN), a wide area network (WAN), or other type of network. Such networking environments are commonplace in offices, enterprise-wide computer networks, intranets and the Internet. In a networked environment, executable code and application programs may be stored in the remote computer. By way of example, and not limitation, FIG. 1 illustrates remote executable code 148 as residing on remote computer 146. It will be appreciated that the network connections shown are exemplary and other means of establishing a communications link between the computers may be used. Those skilled in the art will also appreciate that many of the components of the computer system 100 may be implemented within a system-on-a-chip architecture including memory, external interfaces and operating system. System-on-a-chip implementations are common for special purpose hand-held devices, such as mobile phones, digital music players, personal digital assistants and the like.

Composite Record Keys Ordered in a Flat Key Space for a Distributed Database

The present invention is generally directed towards a system and method for composite record keys ordered in a flat key space for a distributed database. A data schema may be created that defines a composite record key for data records in a canonical form, and a composite record key may be constructed in the canonical form defined by the data schema for each data record in data tables of a distributed database. Once a composite record key may be constructed in canonical form defined by the data schema for each data record in data tables of a distributed database, the composite record key in canonical form for each data record in the distributed database may be inserted into an index in sorted order. Advantageously, the composite record keys may be ordered in either ascending or descending order. The index of composite record keys ordered in a flat key space for a distributed database may then be used for efficiently comparing or sorting distributed data records in a large distributed database. As used herein, a composite record key space may mean the set of possible composite record key values for data tables of a database. A flat composite record key space as used herein refers to a non-hierarchical organization of the set of possible composite record key values for data tables of a database.

As will be seen, composite record keys ordered in a flat key space may be compared by optimized machine instructions for comparing strings, rather than complex code that must take different comparison actions based on the type of attribute of the multiple key types. Moreover, the composite record keys ordered in a flat key space may be compared or sorted without the need to reference the data schema of the composite record keys. As will be understood, the various block diagrams, flow charts and scenarios described herein are only examples, and there are many other scenarios to which the present invention will apply.

Figure 2:
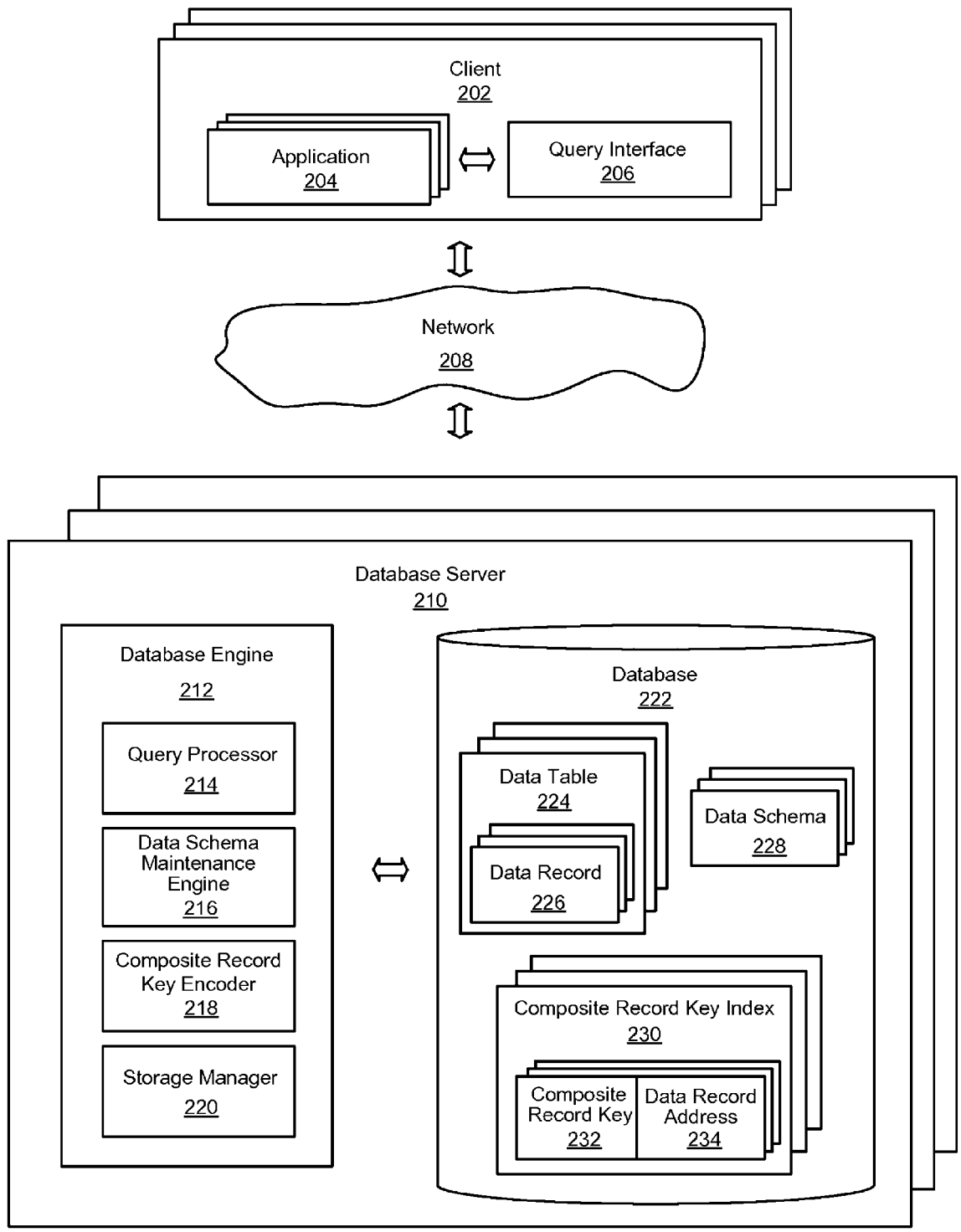
FIG. 2 is a block diagram generally representing an exemplary architecture of system components for composite record keys ordered in a flat key space for a distributed database, in accordance with an aspect of the present invention.

Turning to FIG. 2 of the drawings, there is shown a block diagram generally representing an exemplary architecture of system components for composite record keys ordered in a flat key space for a distributed database. Those skilled in the art will appreciate that the functionality implemented within the blocks illustrated in the diagram may be implemented as separate components or the functionality of several or all of the blocks may be implemented within a single component. For example, the functionality for the storage manager 220 on the database server 210 may be implemented as a separate component from the database engine 212. Or the functionality for the storage manager 220 may be included in the same component as the database engine 212 as shown. Moreover, those skilled in the art will appreciate that the functionality implemented within the blocks illustrated in the diagram may be executed on a single computer or distributed across a plurality of computers for execution.

In various embodiments, several networked client computers 202 may be operably coupled to one or more database servers 210 by a network 208. Each client computer 202 may be a computer such as computer system 100 of FIG. 1. The network 208 may be any type of network such as a local area network (LAN), a wide area network (WAN), or other type of network. An application 204 may execute on the client 202 and may include functionality for invoking a query interface 206 for sending a database query to a database server 210 for processing the database query. For instance, the application 204 may invoke the query interface 206 to retrieve a data record 226 in a data table 224 of a distributed database. In general, the application 204 and the query interface 206 may be any type of interpreted or executable software code such as a kernel component, an application program, a script, a linked library, an object with methods, and so forth. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

The database servers 210 may be any type of computer system or computing device such as computer system 100 of FIG. 1. The database servers 210 may represent a large distributed database system of operably coupled database servers. In general, each database server 210 may provide services for performing semantic operations on data in the database 222 and may use lower-level file system services in carrying out these semantic operations. Each database server 210 may include a database engine 212 which may be responsible for communicating with a client 202, communicating with the database servers 210 to satisfy client requests, accessing the database 222, and processing database queries. The database engine 212 may include a query processor 214 for processing received queries including retrieving a data record 226 from a data table 224 in the database 222, a data schema maintenance engine 216 for updating the data schema 228 defining composite record keys 232 stored with associated data record addresses 234 in the composite record key index 230 ordered in a flat key space, a composite record key encoder 218 for generating composite record keys 232 for data records 226, and a storage manager 220 for reading data records 226 from the database 222 and writing data records 226 to the database 222. Each of these modules may also be any type of executable software code such as a kernel component, an application program, a linked library, an object with methods, or other type of executable software code. Each of these components may alternatively be a processing device such as an integrated circuit or logic circuitry that executes instructions represented as microcode, firmware, program code or other executable instructions that may be stored on a computer-readable storage medium. Those skilled in the art will appreciate that these components may also be implemented within a system-on-a-chip architecture including memory, external interfaces and an operating system.

There are many advantageous uses of composite record keys ordered in a flat key space for a large distributed database. First of all, large data sets may be efficiently sorted, particularly where each record in the data set is a composite of multiple typed attributes. For instance, an efficient distributed sort, such as a map-reduce algorithm may be performed over the keys without having to communicate data schema information between components of the distributed system. As another example, composite record keys ordered in a flat key space may be used for ordered storage of large data sets on disk in various sorted formats. Typically on-disk sorted data sets are stored as B-trees or some other partitioned index; consequently, storing a new record may first require determining which partition to place it in, followed by sorting that partition to include the new key. In both cases, composite record keys ordered in a flat key space are useful to efficiently compare the key of the new record to the partition boundaries, and then efficiently sort the partition without needing to look up the data schema of the composite keys. As a third example, composite record keys ordered in a flat key space may be used for efficient data routing in a distributed storage system where the partitions of data are stored on different servers. Typically the appropriate server must be found before a data record can be read or written. Usually there is a data structure that maps key ranges to servers, and this data structure is managed by a software router. If the router must route composite record keys, it can use the composite record keys ordered in a flat key space to efficiently find the correct server, without having to store the data schema of the composite record key on the router or look it up during routing. This will enable higher throughput routing. For any of these uses, composite record keys ordered in a flat key space may be compared by optimized machine instructions for comparing strings, rather than complex code that must take different comparison actions based on the type of attribute of the multiple key types. Moreover, the composite record keys ordered in a flat key space may be compared or sorted without knowing the data schema of the composite record keys.

Figure 3:
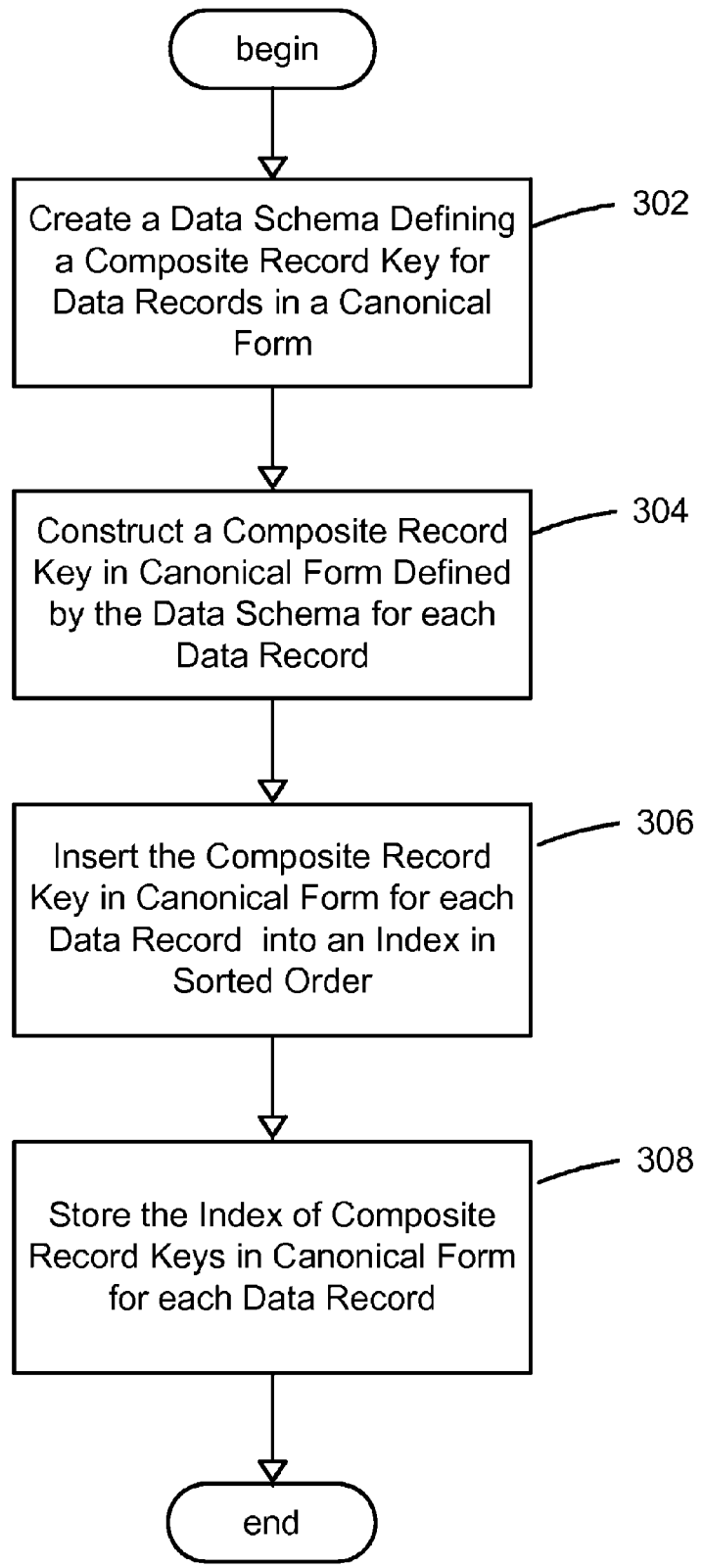
FIG. 3 is a flowchart generally representing the steps undertaken in one embodiment for composite record keys ordered in a flat key space for a distributed database, in accordance with an aspect of the present invention.

FIG. 3 presents a flowchart for generally representing the steps undertaken in one embodiment for composite record keys ordered in a flat key space for a distributed database. At step 302, a data schema may be created that defines a composite record key for data records in a canonical form. Consider for example a composite record key specified by a data schema defining two key value fields such as (string, integer). In this case, each composite record key will have two values, a string field and an integer field. For sorting purposes, it is beneficial to compare the string value first, and if it is equal to the string value of another composite record key, then the integer field may be compared to the integer value of the other composite record key. A string of bytes may accordingly be constructed in such a way that a simple byte-to-byte comparison between two strings may be used to sort the strings in ascending or descending order.

To do so, a KeySchema object may be created in an embodiment which defines the schema of a composite record key. In the KeySchema object, key fields may be added in the order that the key fields are desired to be sorted. In general, the first key field added will be sorted first, then the second key field added will be sorted second, and so on. When adding a key field, a sort order attribute for the key field may be defined to specify whether to sort in ascending or descending order on the key field. Different key fields can be sorted in different ways. For example, a KeySchema object may be defined by the following pseudo code:

```
KeySchema ks=new KeySchema( );
ks->addField(TypeString,SortAscending);
ks->addField(TypeInteger,SortDescending);
```

This data schema has two fields. The first field is defined to be a string field which sorts in ascending order. The second field is defined to be an integer field which sorts in descending order. Thus, the following composite record key values may be sorted in the following order:
Apple,15
Apple,12
Banana,5
Kiwi,6.

Returning to FIG. 3, a composite record key may be constructed in canonical form defined by the data schema for each data record in data tables of a distributed database at step 304. For instance, a CompositeKey object may be created that is defined by a KeySchema. In an embodiment, the values for each of the key fields in the composite record key may be specified and, then, the values may be serialized to create a byte array. For example, a CompositeKey object may be defined by the following pseudo code:

```
CompositeKey * k=new CompositeKey(ks);
k->setStringValue(0,"Apple");
k->setIntValue(1,15);
unsigned char * buffer=k->serialize( );
```

The resulting buffer may then be compared to other strings such as composite key records using a CompositeKey_strcmp( ) function, for instance as illustrated in the following pseudo code:

```
if (CompositeKey_strcmp(buffer,otherbuffer)<1)
{
//buffer sorts first
}
else if (CompositeKey_strcmp(buffer,otherbuffer)>1)
{
//otherbuffer sorts first
}
else if (CompositeKey_strcmp(buffer,otherbuffer)==0)
{
//both composite record keys are equal
}
```

The CompositeKey_strcmp( ) function may generally read the length of the buffer for a composite record key and then perform a byte-to-byte comparison of two values for composite record keys. In an embodiment, the first sizeof(int) bytes of a composite record key buffer may be an integer specifying the length of the buffer.

Once a composite record key may be constructed in canonical form defined by the data schema for each data record in data tables of a distributed database, the composite record key in canonical form for each data record in the distributed database may be inserted into an index in sorted order at step 306. In an embodiment, the index may be a composite record key index 230 as illustrated in FIG. 2 with multiple composite record keys 232 and an associated data record address 234. The composite record keys may be in an ordered flat key space in either ascending or descending order. The ordered flat key space represents a range of non-hierarchical values in sorted order. In an embodiment, the non-hierarchical values may be represented as a string with delimiters between fields of values such as string values and integer values in most significant byte order.

Once the composite record key in canonical form may be inserted into an index in sorted order for each data record, the index of composite record keys in canonical form may be stored at step 308. The index of composite record keys ordered in a flat key space for a distributed database may then be used for efficiently comparing or sorting distributed data records in a large distributed database.

Figure 4:
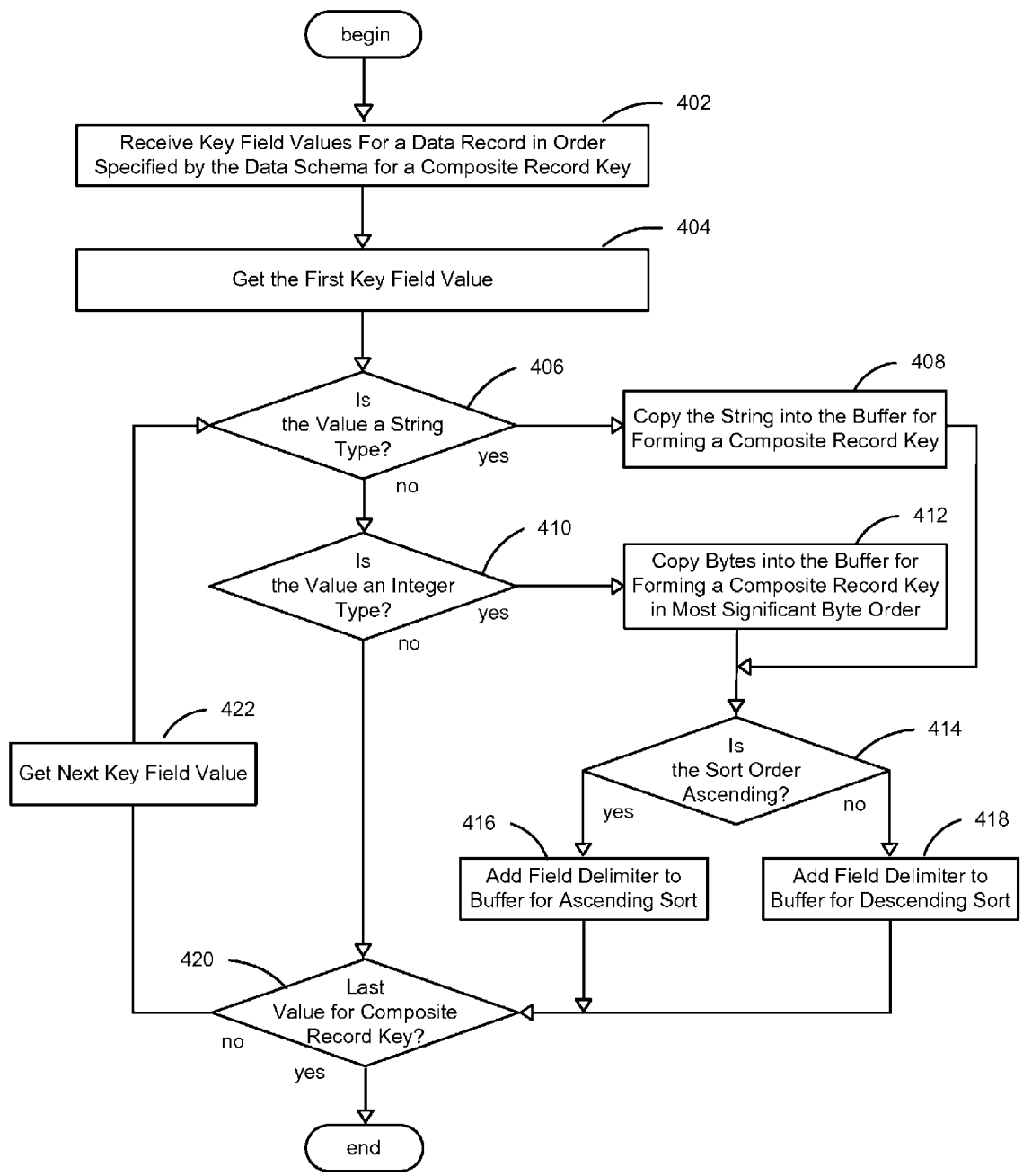
FIG. 4 is a flowchart generally representing the steps undertaken in one embodiment to construct a composite record key in canonical form defined by the data schema for a data record, in accordance with an aspect of the present invention.

FIG. 4 presents a flowchart for generally representing the steps undertaken in one embodiment to construct a composite record key in canonical form defined by the data schema for a data record. At step 402, record key field values for a data record may be received in the order specified by the data schema for a composite record key. At step 404, the first key field value of the data record may be obtained for the composite record key. At step 406, it may be determined whether the key field value of the data record is a string type. If so, then the string may be copied into a buffer for forming a composite record key at step 408 and processing may continue at step 414. If it may be determined that the key field value of the data record is not a string type, it may be determined whether the key field value of the data record is an integer type at step 410. If so, then the bytes of the integer value may be copied in most significant byte order into the buffer for forming the composite record key at step 408 and processing may continue at step 414. Otherwise, if may be determined that the key field value of the data record is not an integer type at step 410, then processing may continue at step 420.

Once a key field value of a data record, such as a string or integer value, has been copied into the buffer for forming the composite record key, a field delimiter may be added after the key field value in the buffer for forming the composite record key. Note that the field delimiter may be different depending upon the sort order, for instance ascending or descending. In an embodiment, the field delimiter may be the special character, 0x00, if the field is defined to be sorted in ascending order, or the field delimiter may be the special character, 0xff, if the field is defined to be sorted in descending order. In an embodiment, if a field is defined to be sorted in descending order, the value of the delimiter is stored in 1's complement (e.g. each byte is XOR-ed with 0xff) to provide sorting in descending order when doing byte-to-byte comparisons of the data. The field delimiters may ensure that short strings sort before longer strings with the same prefix. For example, "Apple" sorts before "Apples", when sorting in ascending order. When sorting in descending order, short strings may sort after longer strings with the same prefix. For further illustration, the following composite key values are in sorted order for a data schema defined as (String:Ascending, Int: Descending):

(Apple,15): "A p p l e 0x00 0xF0 0xFF 0xFF 0xFF 0xFF"
(Apple,12): "A p p l e 0x00 0xF3 0xFF 0xFF 0xFF 0xFF"
(Apples,15): "A p p l e s 0x00 0xF0 0xFF 0xFF 0xFF 0xFF"

Note that "0x00" sorts before all other characters, and "0xFF" sorts after all other characters. Given that integers have 4 bytes, a delimiter may not accordingly be compared to an integer byte. In the example above, composite record key values (Apple,15) sorts before (Apple,12) because the first point of difference is the first byte of the integer field, and since 0xF0<0xF3, the integer value 15 is sorted before the integer value 12 where the field specifies a descending sort order. And composite record key values (Apple,15) sorts before (Apples,15) because the first point of difference is the 6th byte of the string field, and since 0x00<'s', the character value 0x00 is sorted before the character value 's' where the field specifies an ascending sort order.

Returning to FIG. 4, it may be determined at step 414 whether the sort order may be ascending. If so, then a field delimiter for an ascending sort order may be added into the buffer for forming the composite record key at step 416. Otherwise, if it may be determined at step 414 that the sort order may not be ascending, then a field delimiter for a descending sort order may be added into the buffer for forming the composite record key at step 418.

At step 420, it may be determined whether the last key field value from the data record was received for forming the composite record key. If not, then processing may continue at step 422 and the next key field value may be obtained for the data record. Otherwise, processing may be finished for constructing a composite record key in canonical form defined by the data schema for a data record.

Figure 5:
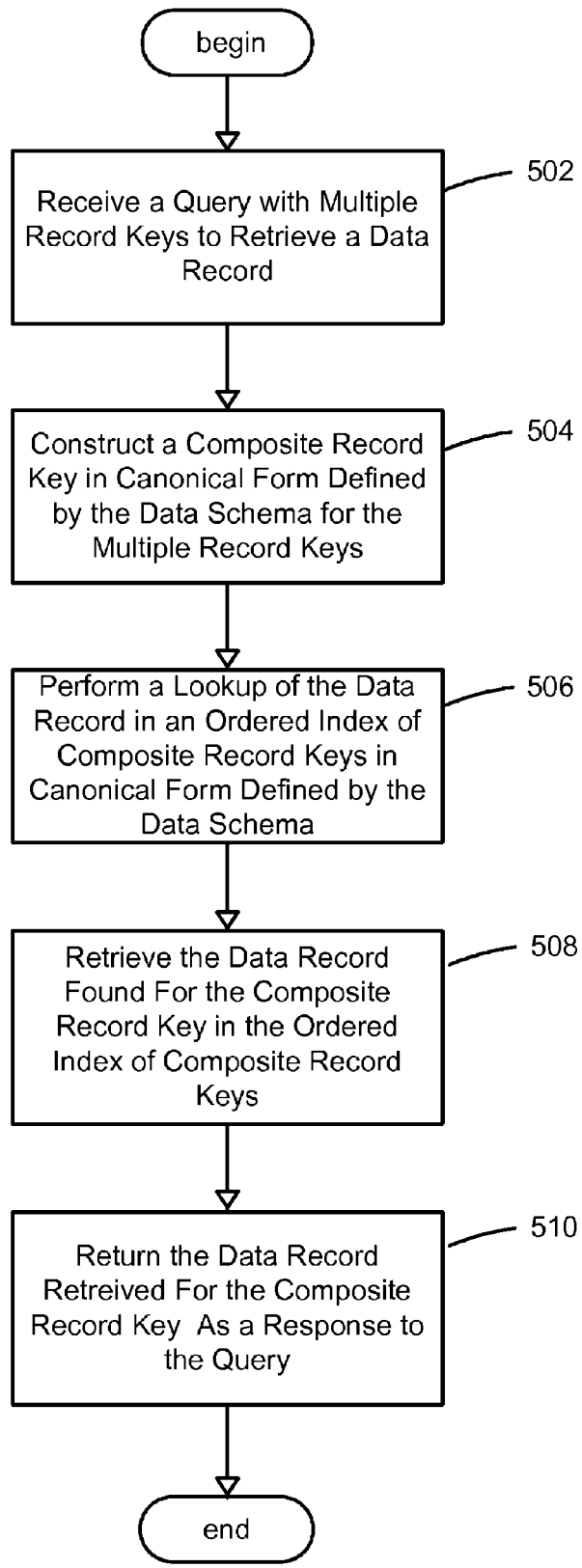
FIG. 5 is a flowchart generally representing the steps undertaken in one embodiment for query processing using the index of composite record keys ordered in a flat key space to retrieve a data record in a data table of a distributed database, in accordance with an aspect of the present invention.

Once the index of composite record keys in canonical form may be built and stored, it may then be generally used for efficiently comparing or sorting distributed data records in a large distributed database since the composite record keys are ordered in a flat key space. FIG. 5 presents a flowchart for generally representing the steps undertaken in one embodiment for query processing using the index of composite record keys ordered in a flat key space to retrieve a data record in a data table of a distributed database. At step 502, a database query request with multiple record keys may be received from an application to retrieve a data record in a data table of a distributed database. For example, an application may invoke a query interface for sending a request to retrieve a data record in a data table of a distributed database and the request may then be sent by the query interface to a database server for processing.

At step 504, a composite record key may be constructed in canonical form defined by the data schema for the multiple record keys from the query request. In an embodiment, the composite record key may be constructed for the multiple record keys using steps 404-422 described in conjunction with FIG. 4 above. At step 506, the composite record key constructed for the multiple record keys from the query may be used to perform a lookup of the data record corresponding to the composite record key in the ordered index of composite record keys in canonical form defined by the data schema. For instance, the ordered index of composite record keys defined by the data schema may be in ascending or descending order. The composite record key constructed for the multiple record keys from the query may be compared with the composite record keys in the index using a binary search or any other search technique for ordered lists known to those skilled in the art to locate a corresponding composite record key. In an embodiment, a data record address may be associated with each composite record key in the ordered index. At step 508, the data record found for the corresponding composite record key in the ordered index may be retrieved. In an embodiment, the data record may be retrieved by locating the data record at the data record address. And at step 510, the data record retrieved for the composite record key may be returned as a response to the query request.

Thus the present invention may provide composite record keys ordered in a flat key space for a distributed database. Importantly, the present invention provides composite record keys in a canonical form that can be sorted like strings, even if the composite record key includes an integer or other types, by doing a simple byte-to-byte comparison between composite record keys. These comparisons are efficient since the machine instructions for string comparisons are fast. Moreover, one or few servers may store the data schema and each of the servers may simply store an ordered index of composite record keys for looking up data records. Thus administration of the metadata is easier since it may be maintained on one or few machines and not distributed with the data records. As a result, a very high throughput may be achieved for composite key sorting with minimal state transfer between database servers.

As can be seen from the foregoing detailed description, the present invention provides an improved system and method for composite record keys ordered in a flat key space for a distributed database. A data schema may be created that defines a composite record key for data records in a canonical form, and a composite record key may be constructed in canonical form defined by the data schema for each data record in data tables of a distributed database. Once a composite record key may be constructed in canonical form defined by the data schema for each data record in data tables of a distributed database, the composite record key in canonical form for each data record in the distributed database may be inserted into an index in sorted order. Advantageously, the composite record keys may be ordered in either ascending or descending order. The index of composite record keys ordered in a flat key space for a distributed database may then be used for efficiently comparing or sorting distributed data records in a large distributed database. Accordingly, the system and method provide significant advantages and benefits needed in contemporary computing, and more particularly in large scale distributed databases.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A distributed computer system for indexing data records by composite record keys, comprising:
   a plurality of database servers operably coupled to provide a distributed database stored across the plurality of database servers;
   an index of composite record keys ordered in a flat composite record key space stored on at least one of the plurality of database servers for accessing a plurality of data records in the distributed database, each of the plurality of composite record keys constructed in a canonical form defined by a data schema; and
   a composite record key encoder operably coupled to the at least one of the plurality of database servers for constructing each of the plurality of composite record keys in the canonical form defined by the data schema.

2. The system of claim 1 further comprising a data schema maintenance engine operably coupled to the at least one of the plurality of database servers that updates the data schema defining the canonical form for constructing the plurality of composite record keys that may be ordered in the flat composite record key space.

3. The system of claim 1 further comprising a storage manager operably coupled to the at least one of the plurality of database servers for storing the index of composite record keys ordered in the flat composite record key space on the at least one of the plurality of database servers.

4. A computer-readable storage medium having computer-executable components comprising the system of claim 1.

5. A computer-implemented method for indexing data records by composite record keys, comprising:
   constructing a composite record key in canonical form specified by a data schema defining a flat composite record key space for each of a plurality of data records;
   inserting the composite record key in the canonical form specified by the data schema defining the flat composite record key space for each of the plurality of data records into an index in sorted order; and
   storing the index in sorted order by the composite record key in the canonical form specified by the data schema defining the flat composite record key space for each of the plurality of data records.

6. The method of claim 5 further specifying the data schema defining the flat composite record key space for the composite record key in the canonical form for each of the plurality of data records.

7. The method of claim 6 further comprising storing the data schema defining the flat composite record key space for the composite record key in the canonical form for each of the plurality of data records.

8. The method of claim 5 further comprising receiving a plurality of record keys in a query to retrieve at least one of the plurality of data records.

9. The method of claim 8 further comprising constructing another composite record key in the canonical form specified by the data schema defining the flat composite record key space for the plurality of record keys in the query.

10. The method of claim 9 further comprising using the another composite record key to perform a lookup of at least one composite record key in the index.

11. The method of claim 10 further comprising retrieving the at least one of the plurality of data records for the at least one composite record key in the index.

12. The method of claim 11 further comprising returning the at least one of the plurality of data records for the at least one composite record key in the index as a response to the query.

13. The method of claim 5 wherein constructing the composite record key in the canonical form specified by the data schema defining the flat composite record key space for each of the plurality of data records comprises receiving a plurality of key field values for a data record of the plurality of data records in an order specified by the data schema for the composite record key.

14. The method of claim 13 further comprising determining whether a key field value of the plurality of key field values is a string type and copying the string of the key field value into a buffer for forming a composite record key.

15. The method of claim 14 further comprising:
   determining whether the sort order specified by the data schema is ascending order;
   if so, adding a field delimiter to the buffer for ascending sort order; and
   if not, adding a field delimiter to the buffer for descending sort order.

16. The method of claim 13 further comprising determining whether a key field value of the plurality of key field values is an integer type and copying bytes of the key field value into a buffer in most significant byte order for forming a composite record key.

17. The method of claim 16 further comprising:
   determining whether the sort order specified by the data schema is ascending order;
   if so, adding a field delimiter to the buffer for ascending sort order; and
   if not, adding a field delimiter to the buffer for descending sort order.

18. A computer-readable storage medium having computer-executable instructions for performing the method of claim 5.

19. A distributed computer system for indexing data records by composite record keys, comprising:
   means for receiving a query with a plurality of record keys to retrieve a data record in a distributed database;

means for constructing a composite record key in canonical form specified by a data schema defining a flat composite record key space for a plurality of data records in the distributed database;

means for looking up the data record in an ordered index of a plurality of composite record keys generated in canonical form specified by a data schema defining a flat composite record key space for a plurality of data records in the distributed database; and means for returning the data record in response to the query.

20. The computer system of claim 19 further comprising means for building the ordered index of the plurality of composite record keys generated in canonical form specified by the data schema defining the flat composite record key space for the plurality of data records in the distributed database.

* * * * *